United States Patent [19]

Bishop et al.

[11] Patent Number: 4,746,580
[45] Date of Patent: May 24, 1988

[54] READ-ONLY MAGNETIC RECORDING MEDIA

[75] Inventors: Ross W. Bishop; Arthur E. Moxley, both of Longmont, Colo.

[73] Assignee: International Business Machines Corporation, Armonk, N.Y.

[21] Appl. No.: 837,659

[22] Filed: Mar. 6, 1986

Related U.S. Application Data

[63] Continuation of Ser. No. 480,635, Mar. 31, 1983, abandoned.

[51] Int. Cl.$^4$ .............................................. H01F 10/02
[52] U.S. Cl. ....................................... 428/557; 427/48;
427/128; 427/132; 427/250; 427/259; 427/264;
427/287; 427/295; 428/64; 428/304.4; 428/458;
428/551; 428/601; 428/611; 428/615; 428/693;
428/694; 428/900; 428/928
[58] Field of Search ................................ 427/127–132,
427/48, 250, 259, 264, 287, 295; 428/64, 304.4,
458, 551, 601, 611, 615, 693, 694, 900, 928

[56] References Cited

U.S. PATENT DOCUMENTS

| | | | |
|---|---|---|---|
| 3,342,632 | 9/1967 | Bate et al. | 117/217 |
| 3,342,633 | 9/1967 | Bate et al. | 117/217 |
| 3,677,843 | 7/1972 | Reiss | 156/3 |
| 3,738,865 | 6/1973 | Takeno et al. | 117/212 |
| 4,097,908 | 6/1978 | Chou et al. | 360/76 |
| 4,098,917 | 7/1978 | Bullock et al. | 427/36 |
| 4,390,404 | 6/1983 | Esho et al. | 427/132 |

FOREIGN PATENT DOCUMENTS 56-119934 9/1981 Japan ....................................... 427/48
1533778 11/1978 United Kingdom .

OTHER PUBLICATIONS

IBM Technical Disclosure Bulletin, vol. 16, No. 4, Sep. 1973, "Magnetic Head Position Sensing", by N. B. Taylor, pp. 1338-1340.
IBM Technical Disclosure Bulletin, vol. 20, No. 5, Oct. 1977, "Read/Write Magnetic Azimuth Adjustment Method", by R. G. Hart et al., pp. 1897-1901.
IBM Technical Disclosure Bulletin, vol. 24, No. 4, Sep. 1981, "Lift-Off Pattern Generation in Sputtered Films", by R. W. Burkhart et al., pp. 2081-2083.

Primary Examiner—Bernard D. Pianalto
Attorney, Agent, or Firm—Francis A. Sirr

[57] ABSTRACT

A method of making read-only magnetic recording media by the use of photolithographic/photoresist techniques, and the vacuum deposition of discrete bits of a high coercivity metal, followed by magnetization of said metal. A nonmagnetic substrate is covered by a layer of photoresist and a layer of high coercivity magnetic material. Selective light-pattern exposure of the resist, followed by layer-removal-procedures, cause the substrate to be covered by islands of hard magnetic material, in the pattern of a desired data track. The substrate is then subjected to the influence of a steady-state magnetic field in order to convert the metal islands into a read-only data pattern which can be read by a magnetic head. A floppy disk of this type is used to stress-test the head placement of floppy disk drives.

18 Claims, 1 Drawing Sheet

READ-ONLY MAGNETIC RECORDING MEDIA

DESCRIPTION

This application is a continuation of Ser. No. 480,635 filed Mar. 31, 1983, now abandoned.

FIELD OF THE INVENTION

This invention relates to the field of magnetic recording media and to a method of making such media.

BACKGROUND OF THE INVENTION

This invention finds particular utility in the field of read-only memory comprising magnetic recording media. An example is floppy disk media.

Read-only memory devices of this type can be used, for example, to stress-test disk drives in order to evaluate the drive's ability to read conventional floppy disks of the read-write variety. Another use of such a master disk is to evaluate how accurately the head of the disk drive is located. Since the master disk's data pattern is at a known position, if the drive's head does not provide an output signal which is within manufacturing specification, the drive is defective.

The prior art provides master disks using conventional media which is written in as accurate a manner as is possible. For example, a floppy disk, having a polyester film (Mylar by E. I. DuPont de Nemours & Co.) substrate which is coated with a continuous magnetizable layer, is placed in a master disk writer. This disk writer is constructed to produce as accurate a data track as possible, considering all of the dimensional tolerances, etc. which inevitably creep into such a disk writer. Uses to which such master disks are put are shown, for example, in U.S. Pat. No. 4,097,908, UK Pat. No. 1,533,778, and the IBM TECHNICAL DISCLOSURE BULLETINS of September 1973 (pages 1338–1340) and October 1977 (pages 1897–1901). These publications are incorporated herein by reference for the purpose of showing the types of master disk read-only data patterns which may be made by practicing the present invention. However, in its broadest aspects, the present invention is not to be limited to any particular data pattern.

As is readily apparent, the ability to reliably test or stress a disk drive, using a master disk, is only as good as the master disk itself is accurately written.

Background of the present invention is also found in the thin film memory arts, where photoresist and etching techniques are used to form selective, accurately located patterns. U.S. Pat. Nos. 3,677,843; 3,738,865 and 4,098,917 are exemplary.

SUMMARY OF THE INVENTION

An object of the present invention is to form a very accurate magnetic read-only data pattern. An exemplary utility for this data pattern is stress testing magnetic read/write devices such as disk drives.

In its broader aspects, the present invention is a method of manufacture wherein a nonmagnetic substrate is coated with a layer of resist, of the type used in semiconductor arts, and a layer of high coercivity material, metal or alloy (hereinafter called metal). The resist is optically exposed, using techniques which are mechanically very accurate and are well known in the semiconductor arts. Exposure of the resist, and the subsequent removal of a portion of the resist, leaves the underlying substrate with a pattern of discrete, isolated, metal bits or islands. These bits define the magnetic data track of the master disk. The substrate is now subjected to a steady-state magnetic field of a known magnetic-flux direction. The result is a master, read-only magnetic media of high positional or geographic accuracy. When this media is used to stress a magnetic recording device, observed variation from the device's manufacturing specification can be reliably charged to problems in the device, and not to inaccuracy in the master media.

Two conventional types of resist/metalization procedures can be used in the practice of this invention.

The preferred type first covers the nonmagnetic substrate (a thin polyester film, or thin nonmagnetic stainless steel) with a layer of photoresist. The photoresist is then optically exposed, using a mask which accurately depicts the bit pattern of the final magnetic data pattern. The photoresist is then developed, to selectively remove portions of the resist, leaving the underlying substrate exposed, by way of voids in the resist. These voids depict the magnetic bit pattern. A thin layer of high coercivity, magnetically-hard, metal is then vacuum deposited onto the photoresist layer and onto the exposed substrate. Lift-off procedures are then used to remove the remaining resist, and at the same time the resist's covering layer of metal. The result is a pattern of metal islands, in the form of the desired data pattern.

A second type of resist/metal procedure first vacuum deposits the thin metal layer onto the substrate, followed by the placement of a resist layer onto the metal layer. The resist layer is again optically exposed, as aforesaid. Conventional etching techniques are then used to remove the exposed resist and the underlying metal layer, leaving a pattern of metal bits, covered by exposed resist, in the form of the desired data pattern.

Whichever resist/metalization procedure is used, the substrate's metal bit pattern is now subjected to a steady state magnetic field, in order to magnetize the individual bits, thus forming a read-only data pattern which can be read by a magnetic head.

The foregoing and other features and advantages of the invention will be apparent from the following more particular description of preferred embodiments of the invention, as illustrated in the accompanying drawing.

DESCRIPTION OF THE PREFERRED EMBODIMENTS

An exemplary use of the present invention is to manufacture master read-only magnetic disks of the floppy type, for use in the precise positioning of a magnetic head relative to the spindle of a floppy disk drive, as the drive is being manufactured.

Copending and commonly assigned U.S. patent application Ser. No. 391,058, filed June 22, 1982, shows a device using such a disk to position a magnetic head during manufacture of a disk drive.

The present invention provides a master disk by the use of photoresist techniques, which in and of themselves are conventional, along with conventional vacuum metal-deposition techniques. The result is a new and unusual master disk of exceptional accuracy.

Figure 1A:
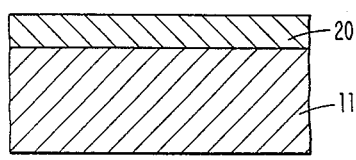
FIGS. 1A, B, C and D show the present invention's preferred means of forming discrete metal bits 10 on a floppy disk substrate 11.

FIGS. 1A, B, C and D show the steps of a preferred embodiment of the present invention. In this process, a flexible, nonmagnetic substrate (disk) 11 is first completely covered, on the top surface, with a layer of photoresist 20. Substrate 11 is preferably a thin, nonmagnetic stainless steel, about 0.002 inch thick. While a polyester film, such as Mylar can be used, stainless steel is available having a low coefficient of thermal and hygroscopic expansion, and this physical property will result in a master disk whose data pattern remains in the desired geographic position as the disk is used in different temperature environments.

Resist 20 is also conventional, and can be either a positive or a negative resist. Use of a negative resist will be described; i.e., the resist is illuminated or exposed in the area where the resist will be removed during the developing step. An exemplary range of thickness for resist layer 20 is about 0.0001 to 0.0003 inch. While the exact resist to be used in practice of the present invention is left to those skilled in the art, it will be readily appreciated by skilled practitioners that the resist should be particle free, and that good practice, such as filtration of the liquid resist before use, should be followed.

An exemplary way to lay down such resist layer 20, when substrate 11 is in the form of an 8-inch or a 5¼-inch disk, is to use the same procedure now used to topically apply a lubricant to such a disk; namely, the liquid resist is dripped onto the center of the rotating disk.

Figure 1B:
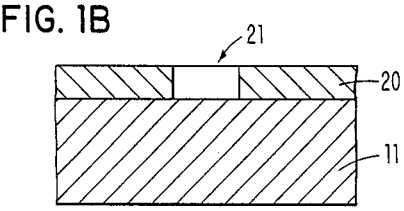

The next steps in the practice of the present invention result in the arrangement shown in FIG. 1B, where substrate 11 is covered by a resist layer 20 having a pattern of accurately located voids 21.

After resist layer 20 is formed on substrate 11, the resist is exposed by the use of a very accurate optical mask (not shown). The technology used to make such a mask is well known, and is used in arts such as the manufacture of semiconductor devices. The mask artwork is preferably made in a manner to compensate for changes in the physical dimensions of substrate 11, with temperature, if substrate 11 is of the temperature sensitive type that can produce movement of the disk's master data pattern when the disk is used in extreme temperature conditions—a condition that is usually avoided. Another state of the art procedure which is preferred, but is not essential to the practice of the present invention, is to form the data pattern artwork using computer-supported polar coordinate techniques to place the artwork, thereby more accurately placing the data pattern onto substrate 11.

Whatever means is used to form such artwork, the exposed/unexposed surface of resist layer 20 is such that subsequent development of the exposed layer removes portions of the layer, and causes layer 20 to contain a population of voids 21 (FIG. 1B) which occupy geographic locations on substrate 11 identical to the desired magnetic, read-only data pattern of the master disk.

Figure 1C:
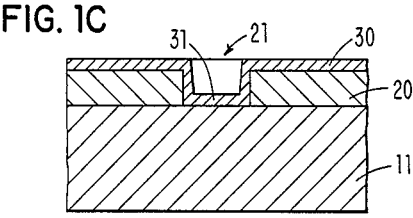

The next step in the process is exemplified by FIG. 1C. In this figure, a thin layer of high permeability magnetic metal has been deposited on top of the entire disk surface, such that all voids 21 now have a layer 31 of such metal attached to the surface of substrate 11. The preferred method of depositing layer 30 is by way of well known vacuum deposition techniques, such as electron beam vaporization or sputter deposition. These techniques readily lend themselves to the deposition of very thin layers such as are needed in the practice of the present invention. An exemplary thickness for layer 30 is in the range of 0.2 to 0.8 micron.

A high permeability metal is preferred, since, as is well known by those of skill in the art, a given volume of an isolated metal bit, formed in accordance with the present invention, will exhibit more signal strength to a read head as it possesses a higher permeability. Thus, the higher the permeability, the smaller can be the volume of metal, including its thickness. As will be appreciated, the thinner the metal bit or island, the smoother will be the master disk of the present invention.

An exemplary commercially available metal which is preferred for layer 30 is Alnico (an aluminum, nickel, cobalt alloy) or Cunife (a trademark of Hoskins Mfg. Co. for a 60% copper, 20% nickel and 20% iron alloy).

Exemplary means of vacuum depositing magnetic coatings are shown in U.S. Pat. Nos. 3,342,632 and 3,342,633.

Figure 1D:
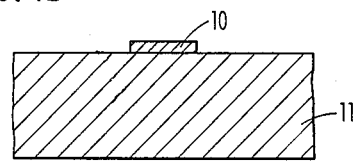

Now that substrate 11 contains the desired bit pattern of islands 31 (FIG. 1C), it is necessary to remove the remaining resist 20, and its covering layer of metal, thereby leaving a pattern of isolated metal bits 10, one of which is shown in FIG. 1D. This procedure is known in the art as lift-off, and an exemplary procedure is described in the IBM TECHNICAL DISCLOSURE BULLETIN of September 1981, at pages 2081-2083.

Figure 4:
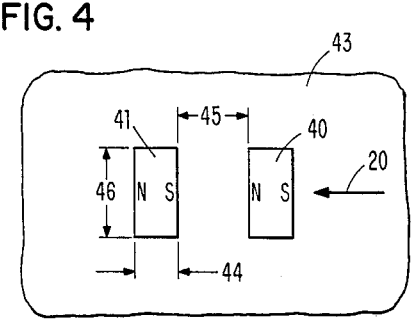
FIG. 4 is a top view of two adjacent metal bits making up a data pattern of a master floppy disk of the present invention.

FIG. 4 shows two such adjacent metal bits 40 and 41, which, with other such islands not shown, form a data pattern to be read by a disk drive's head (also not shown) as relative movement 42 occurs between disk 43 and the head. Exemplary minimum dimensions of the islands are dimension 44 is in the range about 60 microinches to 100 microinches, and dimension 46 is in the range of 0.004 to 0.009 inch. The individual islands 40, 41 are separated by a minimum dimension 45 in the range of about 75 microinches to 100 microinches. Maximum dimensions will depend on the bit pattern or sequence desired.

As has been stated, the data format of the pattern to be formed by the practice of the present invention can take any of a great variety of forms, and FIG. 4 is not to be taken as a limitation on the present invention.

As the last essential step of the present invention the master substrate, now carrying a pattern of high permeability metal bits or islands, is permanently magnetized by the use of a steady-state magnetic field. An exemplary step is shown in FIG. 1D where electromagnet write head 12, whose coil 49 is energized from a DC source of voltage, produces the bit magnetization shown. Head 12 is preferably fixed in position as disk 11 rotates thereunder.

Figure 2A:
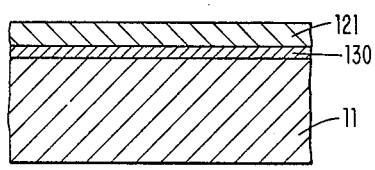
FIGS. 2A, B, C and D show another embodiment of the present invention, as an alternative to FIG. 1.

The embodiment of FIGS. 1A-D is preferred because this procedure produces a more uniform metal cross section for each of the bits 10 (FIG. 1D). However, the present invention is operable using other procedures, for example the process of FIGS. 2A-C. In this process, substrate 11 is first full-surface covered with a thin metal layer 130, identical to layer 30 of FIG. 1C. Then, a layer of resist 120 is placed on top of layer 130, in the manner of layer 20 of FIG. 1A. Thereafter, the top-disposed resist layer is subjected to the aforesaid exposure step which defines the final product's bit pattern.

Figure 2B:
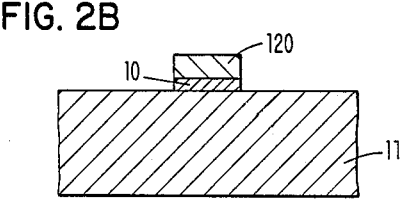
Figure 2C:
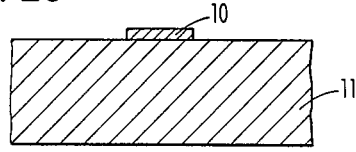
Figure 3:
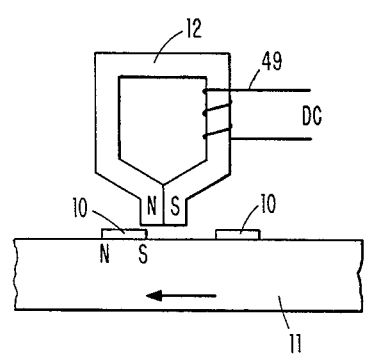
FIG. 3 shows the use of a DC-energized electromagnet 12 to permanently magnetize metal bits 10 into a read-only data pattern.

As the next step in this alternate process, the assembly is subjected to state of the art development, which removes the major portion of the resist layer, and its underlying layer of metal. As a result, the substrate now carries resist-covered metal bits 10 as shown in FIG. 2B. Since the height of these islands is higher than necessary, by the thickness of resist layer 120, this layer is preferably removed by use of an appropriate solvent. The end product is shown in FIG. 2C, i.e., the analog of FIG. 1D.

The resulting master recording disk (FIGS. 1D and 2C) may, if desired, be covered with a thin protective layer, or perhaps a layer of conventional flexible disk lubricant. However, the thickness of bits 10 (FIGS. 1D and 2C), which is in the range of 0.25 micron, provides a master disk which is smoother than the usual floppy disk whose data carrying surface is formed of conventional oxide-bearing polymeric binder.

While the invention has been particularly shown and described with reference to preferred embodiments thereof, it will be understood by those skilled in the art that various changes in form and details may be made therein without departing from the spirit and scope of the invention.

What is claimed is:

1. A method of forming a magnetic data pattern of discrete, isolated, metal bits which define a magnetic data track, in-situ directly on a nonmagnetic substrate, consisting essentially of:
   (a) forming a photoresist layer on a nonmagnetic substrate selected from polyester film or nonmagnetic stainless steel;
   (b) exposing said photoresist layer in the pattern of the data pattern;
   (c) developing the photoresist, to thereby leave discrete, isolated voids in said photoresist layer which expose underlying substrate in the pattern of said magnetic data pattern;
   (d) vacuum depositing a magnetic metal on the remaining photoresist and in the voids;
   (e) removing the remaining photoresist and the metal contained thereon, thereby leaving islands of metal directly on said substrate in the pattern of said magnetic data pattern; and
   (f) permanently magnetizing said metal portions by subjecting said metal portions to a steady-state magnet field, to thereby form permanent read-only magnetic media whose magnetic data pattern is formed in-situ.

2. The method of claim 1 wherein said metal is vacuum deposited.

3. The method of claim 2 wherein said substrate is in the form of a floppy disk, and said data pattern is at least one circular data track on said floppy disk.

4. The method of claim 3 wherein said substrate is chosen from the group polyester film and nonmagnetic stainless steel.

5. The method of claim 4 wherein said metal is Alnico or Cunife.

6. A method of forming a read-only magnetic data pattern in-situ, on a substrate, consisting essentially of:
   (A) using photoresist and magnetic-metal vacuum deposition techniques to form islands of high-coercivity magnetic-metal on a nonmagnetic substrate in a physical geographic pattern which is said data pattern; and
   (B) subjecting said pattern to a steady-state magnetic field.

7. The method of claim 6 wherein said substrate is formed from the group polyester film or stainless steel, about 0.002 inch thick.

8. The method of claim 7 wherein said islands are about 20 microinches thick.

9. The method of claim 8 wherein said metal is a copper/nickel/iron alloy or an aluminum/nickel/cobalt alloy.

10. The method of claim 6 wherein step (A) consists essentially of the steps of:
    (a) forming a continuous photoresist layer on said nonmagnetic substrate;
    (b) exposing said photoresist layer in the pattern of the magnetic data pattern;
    (c) developing the photoresist, to thereby leave voids in said photoresist layer which expose the underlying substrate;
    (d) depositing said metal on the remaining photoresist and in said voids; and
    (e) removing the photoresist and the magnetic alloy contained thereon, thereby leaving portions of said magnetic alloy in the shape of the data pattern.

11. The method of claim 10 wherein said metal is vacuum deposited.

12. The method of claim 11 wherein said substrate is in the form of a floppy disk, and said data pattern is at least one circular data track thereon.

13. The method of claim 12 wherein said substrate is selected from the group polyester film and nonmagnetic stainless steel.

14. The method of claim 13 wherein said metal is selected from the group Alnico or Cunife.

15. A method of making a floppy stress-disk, having a permanent read-only, stress data pattern, for use in a floppy disk drive to determine the accuracy of the head-location within the disk drive, the method of making the disk consisting essentially of:
    providing a floppy nonmagnetic disk substrate;
    using photolithographic/photoresist/vacuum deposition techniques to form discrete, isolated, magnetic-metal bits of high coercivity material directly on said substrate, the location pattern of said bits on said substrate being said stress data pattern; and
    subjecting said substrate and said metal bits to a steady state magnetizing field, to thereby permanently magnetize said metal bits.

16. The method of claim 15 wherein said disk substrate is selected from the group polyester film and nonmagnetic stainless steel.

17. The method of claim 16 wherein an electromagnet is used to provide said magnetic field.

18. A floppy stress-disk, having a read-only stress data pattern, made in accordance with the method of claim 17.

* * * * *